United States Patent [19]

Nehse

[11] Patent Number: 5,678,674

[45] Date of Patent: Oct. 21, 1997

[54] CONTROL DEVICE FOR REGULATING THE ENGAGING PROCESS OF A SEPARATING CLUTCH FOR MOTOR VEHICLES

[75] Inventor: Wolfgang Nehse, Reichling, Germany

[73] Assignee: Bayerische Motoren Werke Aktiengesellschaft, Munich, Germany

[21] Appl. No.: 610,626

[22] Filed: Mar. 4, 1996

[30] Foreign Application Priority Data

Mar. 3, 1995 [DE] Germany .......................... 195 07 429.7
Jul. 5, 1995 [DE] Germany .......................... 195 24 412.5

[51] Int. Cl.$^6$ .......................................... F16D 43/04
[52] U.S. Cl. ............................................... 192/103 R
[58] Field of Search ..................... 192/103 R; 477/175, 477/176, 180

[56] References Cited

U.S. PATENT DOCUMENTS

| | | |
|---|---|---|
| 4,558,772 | 12/1985 | Grimes et al. . |
| 5,072,815 | 12/1991 | Jarvis . |
| 5,275,267 | 1/1994 | Slicker .................. 192/103 R X |

FOREIGN PATENT DOCUMENTS

| | | |
|---|---|---|
| 0 228 544 | 7/1987 | European Pat. Off. . |
| 0 585 817 | 3/1994 | European Pat. Off. . |
| 27 00 821 | 7/1978 | Germany . |
| 33 06 519 | 9/1983 | Germany . |
| 32 14 494 | 10/1983 | Germany . |
| 33 34 717 | 4/1985 | Germany . |
| 40 11 850 | 4/1990 | Germany . |
| 40 13 400 | 10/1990 | Germany . |
| 40 26 659 | 2/1991 | Germany . |
| 2 245 036 | 12/1991 | United Kingdom . |
| WO 88/07457 | 10/1988 | WIPO . |

*Primary Examiner*—Richard M. Lorence
*Attorney, Agent, or Firm*—Evenson, McKeown, Edwards & Lenahan, P.L.L.C.

[57] ABSTRACT

A control device for regulating the engaging process of a separating clutch for motor vehicles for automatically reducing the rpm difference between the driven clutch element and the driving clutch element and/or to regulate the disengaging process of a separating clutch includes a device for detecting the driving rpm and a device for axial adjustment of at least one clutch element of the separating clutch. The device for axial adjustment includes a computer unit, by which the clutch transmission torque can be regulated as a function of a set curve for the driving rpm and/or control or regulation of the clutch transmission torque can be performed in such fashion that the curve of the driving rpm at the beginning of the engagement process is not influenced by a positive contribution of a driving torque and/or control or regulation of the clutch transmission torque and/or a driving torque can be performed in such fashion that the clutch transmission torque is less than the driving torque when the curve of the driving rpm is intended to rise, and vice versa.

9 Claims, 5 Drawing Sheets

CONTROL DEVICE FOR REGULATING THE ENGAGING PROCESS OF A SEPARATING CLUTCH FOR MOTOR VEHICLES

BACKGROUND AND SUMMARY OF THE INVENTION

The invention relates to a control device for regulating the engaging process and/or for regulating the disengaging process of a separating clutch for motor vehicles and, more particularly, to a control device for automatically reducing the rpm difference between the driven clutch element and the driving clutch element including a detector for detecting the driving rpm and a device for axial adjustment of at least one clutch element of the separating clutch.

A control device of the above-mentioned type for automatic clutch operation is known, for example, from German Patent document DE 40 26 659 A1. In this known control device, both the driving rpm, i.e. the rpm of the driving clutch element, and the driven rpm, i.e. the rpm of the driven clutch element, are detected by sensors. At least one clutch element is operated axially through the use of a clutch control to engage or disengage the separating clutch. The clutch is disengaged, especially during a gear shift in the transmission, when the driving rpm and the driven rpm of the clutch elements differ following the engagement of a new gear. In the known control device which preferably operates during a downshift, the driving rpm is controlled to match the rpm values of the clutch elements, for example, through the use of a throttle valve adjustment in the engine serving as the drive. This is done in such fashion that the driving rpm is always higher than the driven rpm shortly before the separating clutch is engaged. As a result, at the moment the separating clutch engages, the clutch element on the driving side and, hence, the drive itself are braked. In this known control device, therefore, at the time the separating clutch completely engages, there still remains a difference in rpm between the driven rpm and the driving rpm. This rpm difference is problematic as it results in a perceptible jerk.

The goal of the invention is to improve a control device of the above-mentioned type in such fashion that maximum comfort is obtained during the engaging process and/or during the disengaging process of a separating clutch that is at least partially disengaged or engaged, respectively.

This goal is achieved by control device for automatically reducing the rpm difference between the driven clutch element and the driving clutch element and/or to regulate the disengaging process of a separating clutch, including a detector for detecting the driving rpm and a device for axial adjustment of at least one clutch element of the separating clutch. The device for axial adjustment includes a computer unit by which regulation of the clutch transmission torque ($M_{dK}$) can be performed as a function of a set curve for the driving rpm (n). The computer unit further controls or regulates the clutch transmission torque ($M_{dK}$) in such fashion that the curve of the driving rpm (n) at the beginning of the engaging process ($t_0$ to $t_x$) is not influenced by a positive contribution of a driving torque ($M_{dMot}$). A device is provided for controlling or regulating the driving torque ($M_{dMot}$). The devices for axial adjustment and for control or regulation of the driving torque include a computer unit by which control or regulation of the clutch transmission torque ($M_{dK}$) and/or the driving torque ($M_{dMot}$) can be performed in such fashion that the clutch transmission torque ($M_{dK}$) is less than the driving torque ($M_{dMot}$) if the curve of the driving rpm (n) is intended to rise and vice versa.

According to the present invention, the device for axial adjustment of a clutch element includes a computer unit by which the clutch transmission torque can be regulated as a function of a set pattern or curve for the driving rpm.

The present invention is based on the idea that optimum comfort is obtained during the engaging process and/or the disengaging process of the separating clutch by regulating the clutch transmission torque. Regulation as a function of a set pattern of the clutch transmission torque would be optimum for this purpose, even by comparison with the actual pattern of the clutch transmission torque at the moment. However, since measuring the clutch transmission torque to produce an actual pattern is too complicated and cost-intensive, regulation is performed according to the invention as a function of a parameter that can be determined simply, namely the rpm of the clutch element on the driving side, which is equal to the engine rpm for example. The advantage of regulation as a function of this driving rpm is the simple physical relationship between a torque and a change in rpm, taking the inertial moment of the rotating masses into account. The following general formula applies here:

$$M = 2p \times J \times dn/dt,$$

where J is the moment of inertia of the rotating masses.

Although the driving rpm depends primarily on a total torque acting on the "drive" system, said torque being composed of a torque on the driving side in the form of an applied energy minus the clutch transmission torque in the form of energy which is lost, preferably the torque on the driving side is kept constant at least temporarily at a preset value in the form of applied energy for simplification, while regulation of the clutch transmission torque is performed exclusively as a function of the set pattern of the driving rpm. This permits a simple regulating strategy without additional hardware expense for a comfortable engaging process and/or disengaging process for a separating clutch.

Further, according to the present invention, the device for axial displacement of a clutch element includes a computer unit by which the clutch transmission torque can be controlled or regulated in such fashion that the pattern of the driving rpm at the beginning of the engaging process, preferably for a predetermined time, is not influenced by a positive contribution from a torque on the driving side.

Especially in the case of a set time which advantageously can also be defined by the attainment of a preset driving rpm, the torque on the driving side in the form of supplied energy is not only kept constant but also kept so low that it makes no contribution to influencing the driving rpm pattern. Preferably, the torque on the driving side is kept constant at a value that is negative with respect to the clutch transmission torque, said value usually being set in any case by a reduction of torque when shifting gears. Thus, according to the invention, for example during an engaging process of the separating clutch, the reduction of the difference in rpm between the clutch element on the driven side and the clutch element on the driving side is performed for the most part exclusively by the corresponding adjustment of the clutch transmission torque. As a result, especially at the beginning of the engaging process, a harmonic acceleration pattern is produced which cannot be achieved with simultaneous regulation or control of the clutch transmission torque and the torque on the driving side because of the complex interplay of the clutch, transmission, and drive. As a result, an improvement in comfort is achieved in an especially simple fashion.

Still further, according to the present invention, a system is also provided for controlling or regulating the torque on the driving side. Control or regulation of the clutch transmission torque and/or the torque on the driving side is performed in such fashion that the clutch transmission torque is less than the torque on the driving side when the curve of the driving rpm is supposed to rise, and the clutch transmission torque is greater than the torque on the driving side when the curve of the driving rpm is supposed to descend.

This invention is based on the idea that for example the engaging process of the separating clutch can be performed when there are especially high requirements imposed on comfort at the price of a post-pulse oscillation of the driving rpm during the reduction of the rpm difference. This concept is based on the idea that the comfort of a vehicle occupant, which depends upon acceleration, can be considerably increased by engaging the clutch slowly, while a brief, slight increase in the driving rpm produces only minor acoustic noise.

It is therefore permitted according to the present invention to change the sign of the gradient in the driving rpm curve in order to then effect a corresponding control or regulation of the clutch transmission torque and/or the torque on the driving side, preferably as a function of a preset set curve of the driving rpm. As a result, optimum comfort during the engaging process and/or during the disengaging process of a separating clutch is achieved in an especially simple fashion.

It should also be pointed out that the present invention also includes any combination of the above-identified systems and devices.

Other objects, advantages and novel features of the present invention will become apparent from the following detailed description of the invention when considered in conjunction with the accompanying drawings.

DETAILED DESCRIPTION OF THE DRAWINGS

Figure 1:
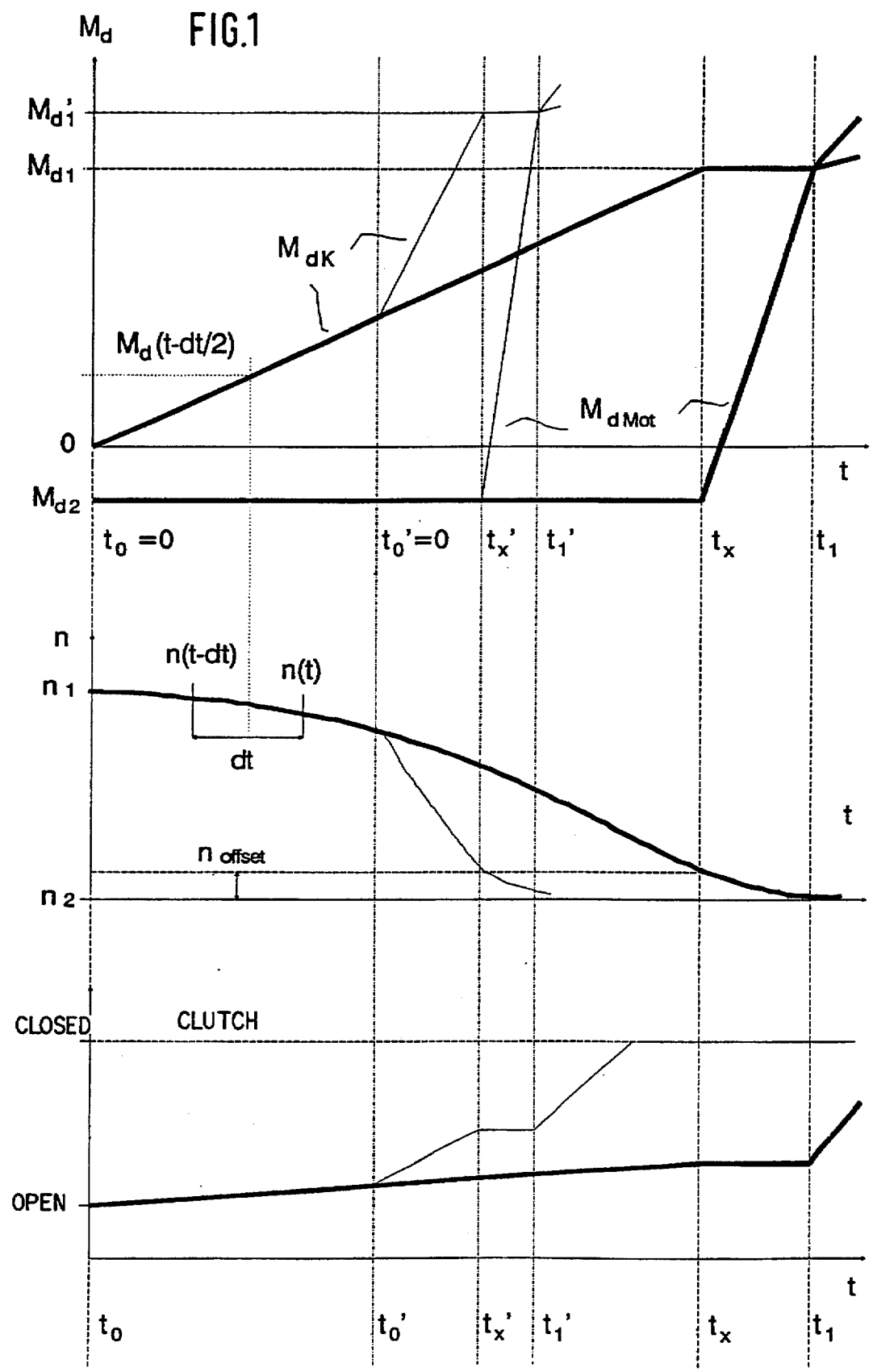
FIG. 1 is a graph illustrating a control device according to the invention that regulates the clutch transmission torque as a function of a set curve for the driving rpm at the beginning of the engaging process without a positive contribution from a torque on the driving side.
Figure 2:
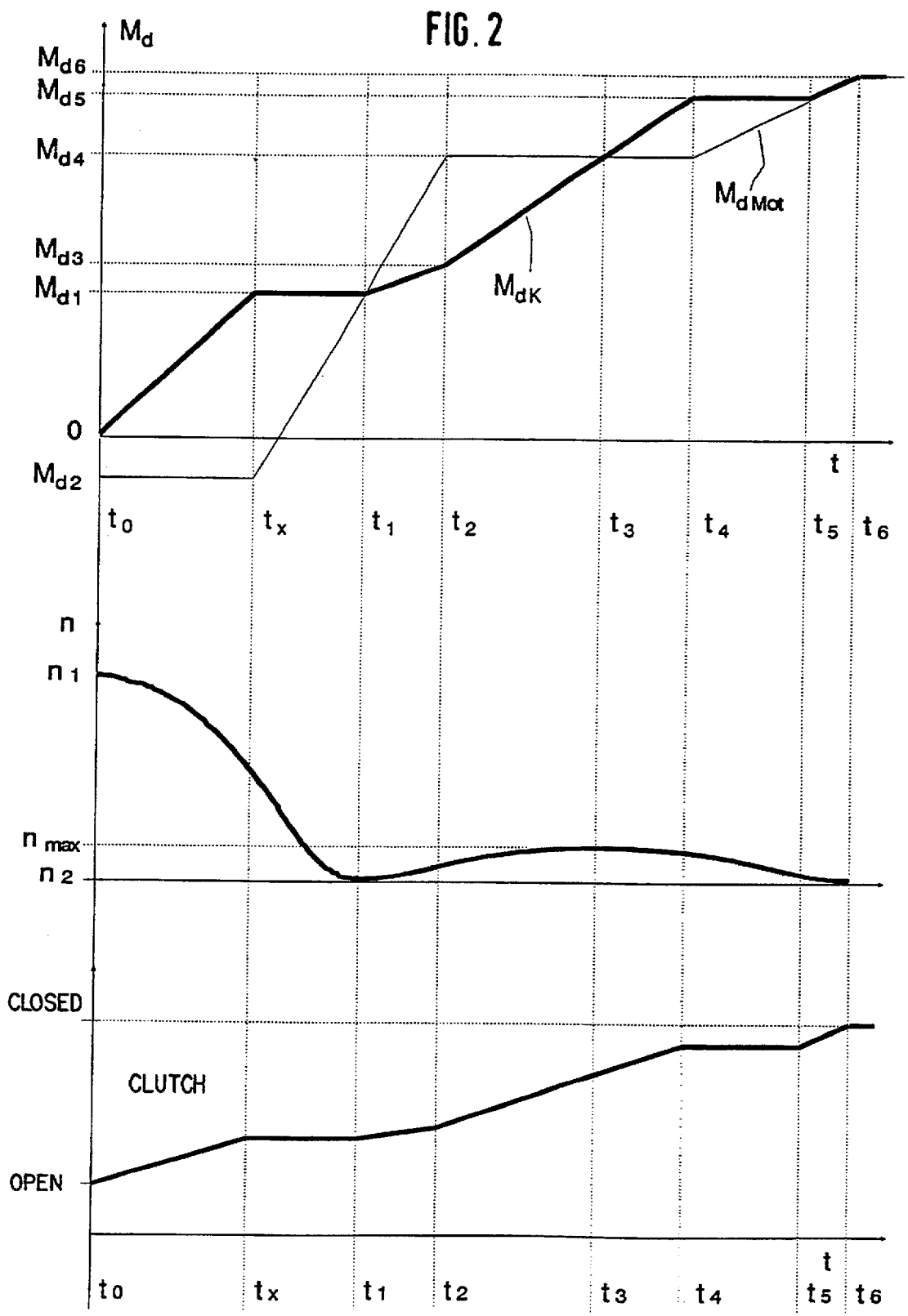
FIG. 2 is a graph illustrating a control device according to the invention that performs regulation to extend the engaging process in which a post-pulse oscillation of the driving torque is allowed.

The control device according to the invention is shown in FIGS. 1 and 2 using the example of an upshift: In FIG. 1, in the upper graph, the torque $M_d$ is plotted on the ordinate and the time t is plotted on the abscissa. Both the curve of the clutch transmission torque $M_{dK}$ and the curve of the torque on the driving side $M_{dMot}$ are shown. In the middle graph, the driving rpm n is plotted as a function of time and in the lower graph the state of the clutch is plotted as a function of time.

At time $t_0=0$, the actual shifting process involving the engagement of a new gear has already taken place so that the engaging process of the disengaged clutch can begin. At the beginning of the engaging process, up to a set time $t_x$, only regulation of the clutch transmission torque $M_{dK}$ is performed as a function of the set curve of the driving rpm n, as shown in the middle graph. The torque on the driving side $M_{dMot}$ is kept constant from $t_0$ until time $t_x$ with a negative torque value $M_{d2}$, which was already set during the gear shift. The torque on the driving side $M_{dMot}$ with a constant value $M_{d2}$, until time $t_x$, makes no positive contribution to the curve of the driving rpm n. The time interval $t_x-t_0$ is defined in such fashion that at time $t_x$, a drive rpm value $n_2+n_{offset}$ is reached. The driving rpm $n_2$ corresponds to the new driving rpm of the clutch element on the transmission side following an upshift. To reduce the difference in rpm between the clutch elements on the driven and driving sides, in this case the driving rpm must be reduced by a value $n_2-n_1$.

The value of the drive rpm difference $n_{offset}$ corresponds to a decrease in rpm which occurs as a result of the engagement of the clutch between times $t_x$ and $t_1$. This value $n_{offset}$ can be additionally calculated and adapted as a function of the newly engaged gear, the acceleration, or the driving resistance. From time $t_0$ to $t_x$, depending on the set curve of the driving rpm n from value $n_1$ to the value $n_2+n_{offset}$, a clutch transmission torque $M_{dK}$ that is required to reach this set curve is calculated by the following formula:

$$M_d = +M_{dMot} - M_{dK} = 2pJ \times dn/dt,$$

where $M_{dMot}$ has a constant value of $M_{d2}$. To regulate the clutch transmission torque $M_{dK}$, this formula is solved for the drive rpm n in order to determine the actual curve of the driving rpm n that results from the momentary clutch transmission torque $M_{dK}$.

For the sake of simplification, FIG. 1 shows a ramp-shaped curve of the clutch transmission torque $M_{dK}$ and a preset time interval dt, which corresponds for example to the scanning cycle time of the computer program. With this simplification, for time $t_x$, for the clutch transmission torque $M_{dK}$ to be set momentarily (t−dt/2) and for the resultant driving rpm n(t) at time t, the following formulas apply:

$$t_x = \frac{2\pi J * (n(t_o) - (n_2 + n_{offset}))}{(M_{d1} + M_d(t_0))/2 - M_{d2}} \quad 1.$$

$$M_d(t - dt/2) = \frac{(t - dt/2)}{t_x} * (M_{d1} - M_d(t_0)) + M_d(t_0) \quad 2.$$

$$n(t) = \frac{2\pi J/dt * n(t - dt) - M_d(t - dt/2) + M_{d2}}{2\pi J/dt}$$

An axial adjustment position of a clutch element corresponds to the clutch transmission torque $M_{dK}$ to be set, between a completely disengaged clutch ("open") and a completely engaged clutch ("closed"). When at time $t_x$ the approximate rpm value $n_2+n_{offset}$ is reached, a continuous increase in the torque $M_{dMot}$ on the driving side begins until time $t_1$ at which the driving torque $M_{dMot}$ has reached the momentary clutch transmission torque $M_{dK}=M_{d1}$. Preferably, during time interval $t_1-t_x$, the momentary clutch transmission torque $M_{dK}$ is kept constant at a value of $M_{d1}$. In other words, the position of the clutch is kept for the same period of time at the position that was set at time $t_x$. The value of $M_{d1}$, for example with an engine as the drive, is selected in such fashion that it corresponds to the minimum possible driving torque that can be achieved by retarding the ignition timing.

One additional possible curve after time $t_1$ is shown in the embodiment in FIG. 2.

In FIG. 1, thinner lines have been used to show possible curves of the clutch transmission torque $M_{dK}$, the driving torque $M_{dMot}$, the driving rpm n, and the clutch position which result for example when increased performance is demanded by the driver during the engagement process, for example in the form of an increase in the accelerator depression angle. In this case, the same measures are taken as in the example corresponding to the thick lines with the exception that all the curves have steeper gradients. From this it follows that both the requirements for comfort and the requirements for performance can be met.

In FIG. 2, all of the curves from time $t_0$ to time $t_1$ correspond to the curves in FIG. 1 at times $t_0$ and $t_0'$ until time $t_1$ and $t_1'$. At time $t_1$, in the lower graph in both FIG. 1 and FIG. 2, it is clear that the clutch is still far from being fully engaged. It would be possible, for example with a steep gradient of clutch torque $M_{dK}$, to engage the clutch as rapidly as possible. In FIG. 2, however, a comfort-optimized curve is shown with which the engaging process is prolonged following the reduction of the rpm difference in order to engage the clutch as gently as possible. For this purpose, a post-pulse oscillation in the curve of the driving rpm n is permitted up to a maximum permissible driving rpm $n_{max}$. From time $t_1$ to time $t_3$ therefore, the curve of the driving rpm n is intended to continue increasing up to a value of $n_{max}$. During this rising phase in the driving rpm curve, the clutch transmission torque $M_{dK}$ is kept lower than the driving torque $M_{dMot}$. Preferably, at the reversal point, at the point in time $t_2$ that corresponds to the change of the gradient in the driving rpm curve, a change is made in the slope of the curve of the clutch transmission torque $M_{dK}$. At time $t_3$, the set curve of the driving rpm n has a gradient with a value of 0 at the maximum permissible driving rpm value of $n_{max}$. At this time $t_3$, the clutch transmission torque $M_{dK}$ and the driving torque $M_{dMot}$ are equal to the torque value $M_{d4}$.

Between times $t_3$ and $t_5$, the curve of the driving rpm n should decrease. During this time interval according to the invention, the clutch transmission torque $M_{dK}$ is made larger than the driving torque $M_{dMot}$. At time $t_5$ the driving rpm $n_2+n_{offset}$ is reached once more, so that the clutch is completely engaged between times $t_6$ and $t_5$. Beginning at time $t_6$, when the clutch is again completely engaged, the value of the clutch transmission torque $M_{dK}$ is equal to the value of the driving torque $M_{dMot}$.

In the lower graph in FIGS. 1 and 2, in each case the proportional curve of the clutch position corresponding to the set clutch transmission torque $M_{dK}$ can be seen.

It should also be mentioned that in the embodiments shown, although only ramp-shaped curves are shown, that any curves of a continuous nature are possible. Ramp-shaped curves however are especially advantageous in order to be able to make simplifications in the computer models for the torque values and the driving rpm values.

In addition, two possible exceptions to point $t_x$ should be mentioned: At time $t_x$, because of various influences, a driving rpm n can be reached which is not either between value $n_2$ and value $n_2+n_{offset}$, or even below the value $n_2$. In the latter case, preferably the driving rpm is initially raised at least to the current value of the clutch transmission torque $M_{dK}$. Then, and in the former case as well, the driving rpm n is raised once more by initially keeping the driving torque $M_{dMot}$, even with a rising clutch transmission torque, higher than the clutch transmission torque. Subsequent procedures again correspond to the embodiment shown in FIG. 2, involving a desired increase or a desired decrease in the driving rpm curve.

Figure 3:
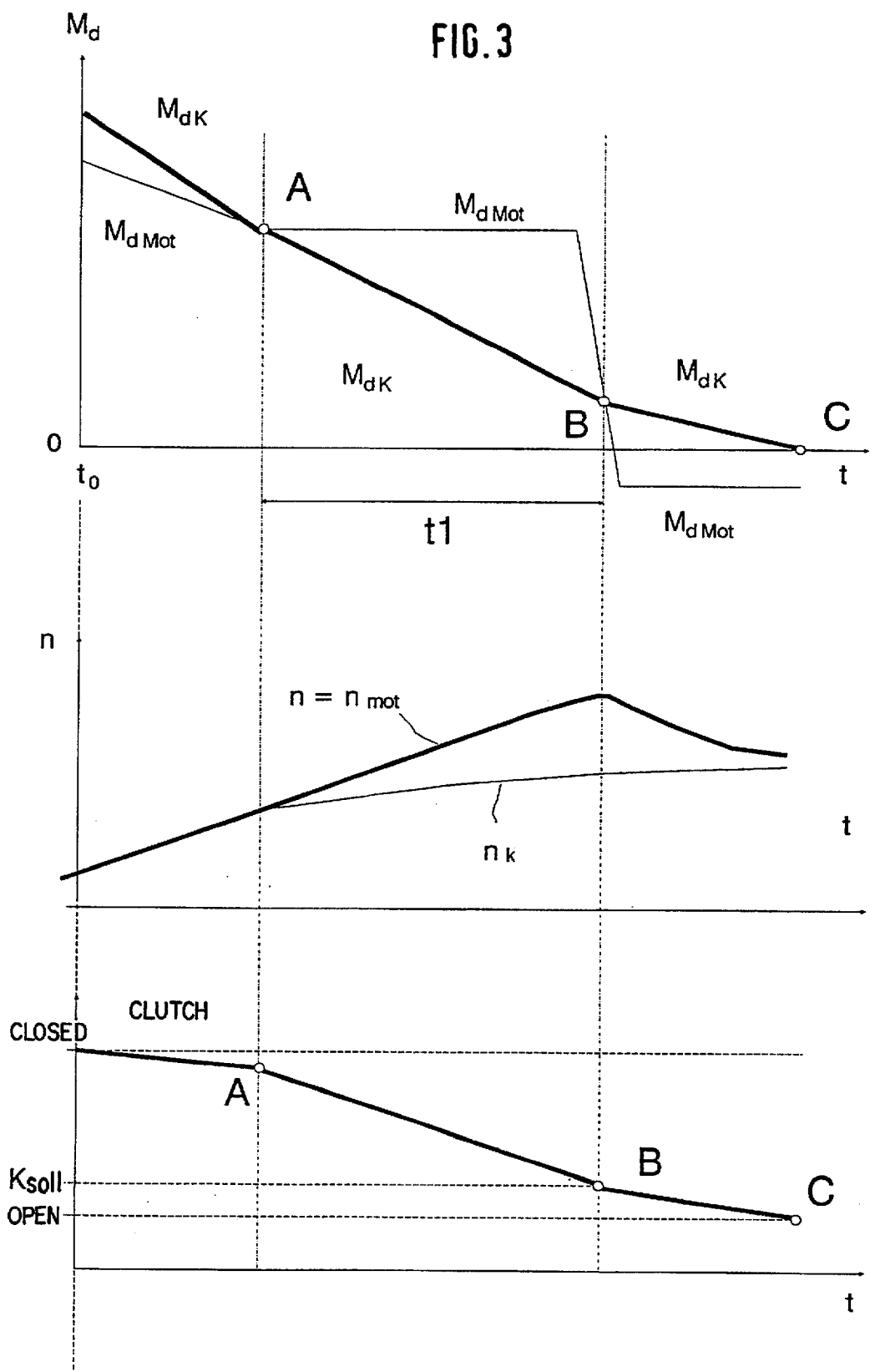
FIG. 3 is a graph illustrating a control device according to the invention which, during a disengaging process of the separating clutch, regulates the clutch transmission torque as a function of a set curve of the driving rpm and/or a desired disengaging curve of the separating clutch.

FIG. 3 shows a disengaging process of the clutch. The upper graph shows the curve of the clutch transmission torque $M_{dK}$ and the torque $M_{dMot}$ on the driving side. The middle graph shows the driving rpm n as a function of time t and the bottom graph shows the state of the clutch as a function of time t.

At time $t_0=0$ a shift command is given to disengage the clutch, for example in the form of a desire to shift gears, so that the disengaging process of the engaged clutch ("closed") begins. At the beginning of the disengaging process, the torque $M_{dMot}$ on the driving side is reduced, for example by retarding the ignition angle or by cutting out one or more cylinders. The torque $M_{dMot}$ on the driving side remains below the clutch transmission torque $M_{dK}$ until time A and is reduced to the maximum extent possible. A slight disengagement of the clutch occurs already before time A at which time the clutch transmission torque $M_{dK}$ is changed to the value of the torque $M_{dMot}$ on the driving side, and is load-dependent in particular.

Between time A and time B, which can be defined by a predetermined time interval t1, the torque $M_{dMot}$ on the driving side is above the clutch transmission torque $M_{dK}$ and is kept constant at the value reached at time A. This causes the driving rpm n to increase relative to the transmission input rpm $n_k$ on the driven side. The kinetic energy is reduced on the driving side in order to be able to reduce it further between times B and C to optimize comfort.

The graph of the clutch transmission torque $M_{dK}$ is regulated between times A and B as a function of a desired curve of the driving rpm n or is controlled as a function of a predetermined disengaging curve of the clutch. Preferably, the curve of the clutch transmission torque $M_{dK}$ is controlled and/or regulated in such fashion that at time B, a predetermined degree of disengagement $K_{soll}$ and/or the maximum of the curve of the driving rpm n is reached. Although the torque $M_{dMot}$ on the driving side is not reduced further between times A and B, a very flat curve for clutch transmission torque $M_{dK}$ is possible, so that optimum comfort is achieved.

Starting at time B, the disengaging process of the clutch and the curve of the driving rpm n are no longer influenced by a positive contribution from the torque $M_{dMot}$ on the driving side. The kinetic energy developed on the driving side between times A and B is reduced once more. As a result, an even flatter curve for clutch transmission torque $M_{dK}$ is possible between times B and C, which results in a very slow and comfortable transition to the completely disengaged state of the clutch ("open").

Between times B and C, the torque $M_{dMot}$ on the driving side again drops below the clutch transmission torque $M_{dK}$ so that the curve of the driving rpm n falls. Because of this, the driving rpm $n=n_{mot}$ can be returned to the transmission input rpm $n_k$ on the driven side.

Figure 4:
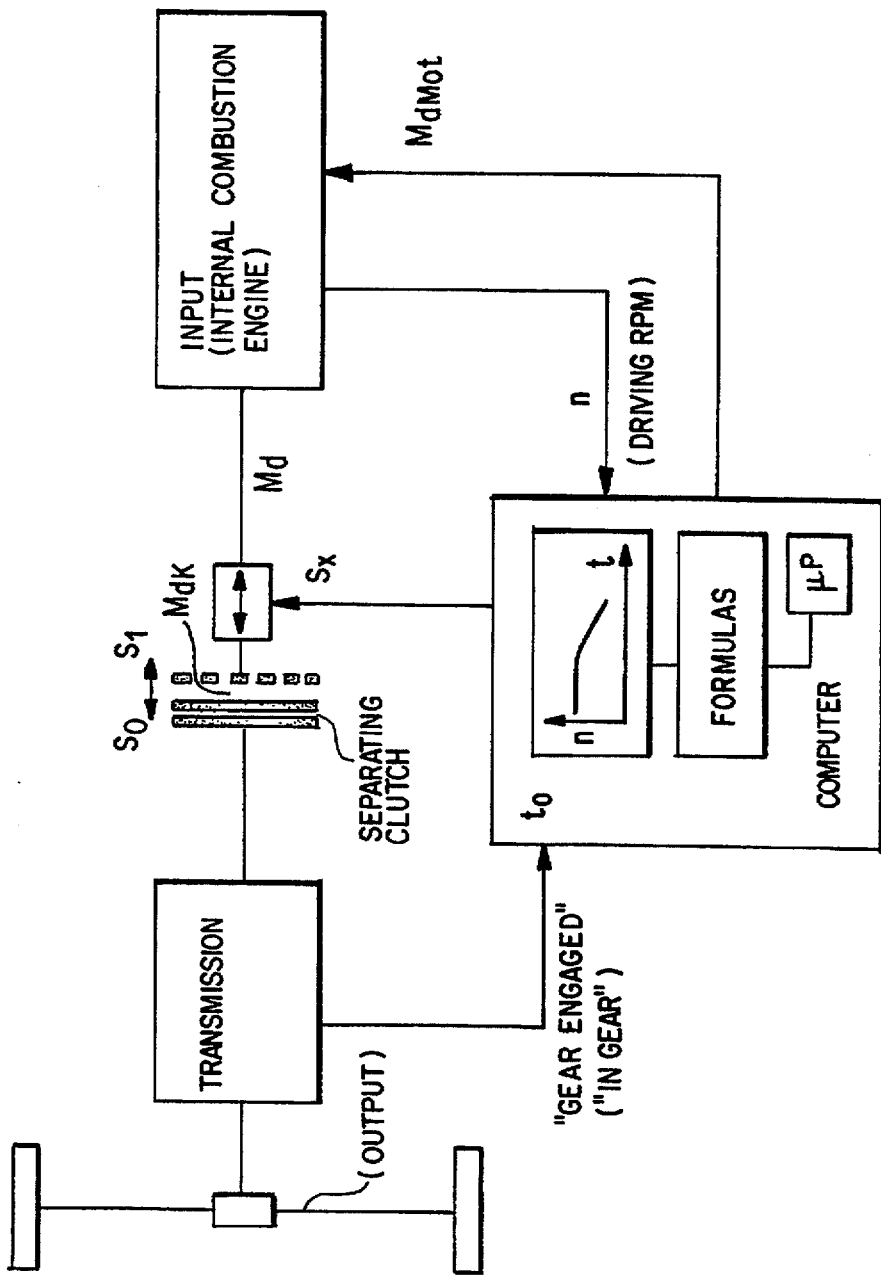
FIG. 4 is a schematic block diagram of a vehicle having the control device according to the present invention.

Referring to FIG. 4, there is shown a motor vehicle having a transmission or speed change gear box coupled to driven wheels of the motor vehicle. The transmission is further coupled to the separating clutch of the vehicle. The internal combustion engine of the vehicle provides a torque signal $M_d$ to the separating clutch and a driving rpm signal n to a control unit. The control unit according to the present invention can be a conventional computer or processor appropriately programmed to carry out the operations fully described herein and by way of example with respect to FIG. 5. The computer further receives a "gear engaged" signal from the transmission. The computer outputs a clutch signal $S_x$ to the separating clutch. The separating clutch is axially adjusted so as to position itself in either a clutch engaged position $S_0$ or a clutch disengaged position $S_1$, wherein the clutch signal $S_x$ is greater than or equal to $S_0$ and less than or equal to $S_1$. The processor further provides a driving side torque signal $M_{dMot}$ to the internal combustion engine. As shown in FIG. 4, the control device makes use of a microprocessor which generates the clutch signal as a function of a set curve for the driving rpm n with respect to time in accordance with the formulas described herein.

Figure 5:
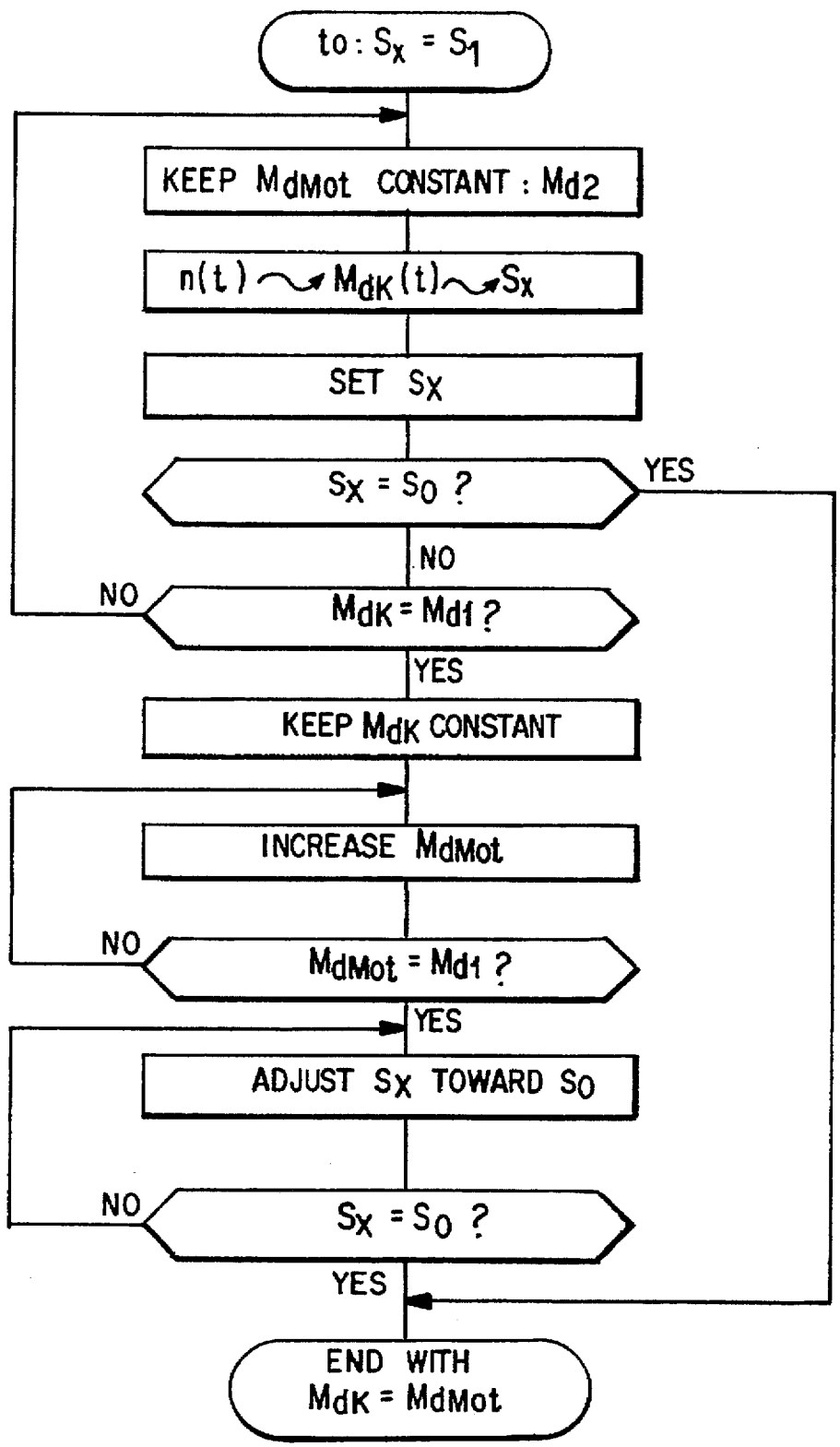
FIG. 5 is a flow chart of a programmed control with respect to an engaging of the clutch as described in the graphs of FIG. 1.

Referring to FIG. 5, there is shown a flow chart illustrating the control of the clutch for regulating the clutch transmission torque as a function of the set curve for the driving rpm at the beginning of the engaging process without a positive contribution from a driving side torque. The flow chart shown in FIG. 5 corresponds with the above-described description with respect to the graphs of FIG. 1 and therefore will not be further elaborated upon here.

With these embodiments, comfort optimization is achieved in a simple and inexpensive manner for an engaging process and/or a disengaging process for a separating clutch for motor vehicles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control device for regulating an engaging process of a separating clutch for a motor vehicle for automatically reducing an rpm difference between a driven clutch element and a driving clutch element in all operating modes of the motor vehicle, comprising:

a detector for detecting a driving rpm;

a device for axially adjusting at least one clutch element of the separating clutch; and wherein said device for axially adjusting comprises a computer unit by which regulation of a clutch transmission torque ($M_{dK}$) is performed exclusively as a function of a set curve for the driving rpm (n).

2. A control device for regulating a disengaging process of a separating clutch for a motor vehicle in all operating modes of the motor vehicle, comprising:

a detector for detecting a driving rpm;

a device for axially adjusting at least one clutch element of the separating clutch; and wherein said device for axially adjusting comprises a computer unit by which regulation of a clutch transmission torque ($M_{dK}$) is performed exclusively as a function of a set curve for the driving rpm (n).

3. A control device for regulating an engaging process of a separating clutch for a motor vehicle for automatically reducing an rpm difference between a driven clutch element and a driving clutch element in all operating modes of the motor vehicle, comprising:

a detector for detecting a driving rpm;

a device for axially adjusting at least one clutch element of the separating clutch; and wherein the device for axially adjusting comprises a computer unit by which regulation of a clutch transmission torque ($M_{dK}$) is performed in such fashion that a set curve of the driving rpm (n) at a beginning of a disengaging process ($t_0$ to $t_x$) is not influenced by a positive contribution from a driving torque ($M_{dMot}$).

4. A control device for regulating a disengaging process of a separating clutch for a motor vehicle in all operating modes of the motor vehicle, comprising:

a detector for detecting a driving rpm;

a device for axially adjusting at least one clutch element of the separating clutch; and wherein the device for axially adjusting comprises a computer unit by which regulation of a clutch transmission torque ($M_{dK}$) is performed in such fashion that a set curve of the driving rpm (n) at a beginning of a disengaging process ($t_0$ to $t_x$) is not influenced by a positive contribution from a driving torque ($M_{dMot}$).

5. A control device for regulating an engaging process of a separating clutch for a motor vehicle for automatically reducing an rpm difference between a driven clutch element and a driving clutch element in all operating modes of the motor vehicle, comprising:

a detector for detecting a driving rpm;

a device for axially adjusting at least one clutch element of the separating clutch;

means for regulating a driving torque ($M_{dMot}$); and wherein said means for regulating, and the device for axially adjusting, comprise a computer unit by which regulation of at least one of a clutch transmission torque ($M_{dK}$) and the driving torque ($M_{dMot}$) are performed in such fashion that the clutch transmission torque ($M_{dK}$) is less than the driving torque ($M_{dMot}$) if a set curve of the driving rpm (n) is intended to rise, wherein the regulation is performed in such fashion that the clutch transmission torque ($M_{dK}$) is greater than the driving torque ($M_{dMot}$) if the curve of the driving rpm (n) is intended to descend.

6. A control device for regulating a disengaging process of a separating clutch for a motor vehicle in all operating modes of the motor vehicle, comprising:

a detector for detecting a driving rpm;

a device for axially adjusting at least one clutch element of the separating clutch;

means for regulating a driving torque ($M_{dMot}$); and wherein said means for regulating, and the device for axially adjusting, comprise a computer unit by which regulation of at least one of a clutch transmission torque ($M_{dK}$) and the driving torque ($M_{dMot}$) are performed in such fashion that the clutch transmission torque ($M_{dK}$) is less than the driving torque ($M_{dMot}$) if a set curve of the driving rpm (n) is intended to rise, wherein the regulation is performed in such fashion that the clutch transmission torque ($M_{dK}$) is greater than the driving torque ($M_{dMot}$) if the set curve of the driving rpm (n) is intended to descend.

7. A control device according to claim 3, wherein said non-influence is performed by maintaining the driving torque ($M_{dMot}$) less than the clutch transmission torque ($M_{dK}$).

8. A control device according to claim 4, wherein said non-influence is performed by maintaining the driving torque ($M_{dMot}$) less than the clutch transmission torque ($M_{dK}$).

9. A control device for regulating one of an engaging and disengaging process of a separating clutch for a motor vehicle, comprising:

a sensor providing a driving rpm signal;

a clutch control which axially adjusts at least one clutch element of the separating clutch; and means for controlling said clutch control to axially adjust said at least one clutch element, said means for controlling including at least one of:

(a) means for regulating a clutch transmission torque ($M_{dK}$) exclusively as a function of a set curve for the driving rpm (n);

(b) means for regulating the clutch transmission torque ($M_{dK}$) such that the set curve of the driving rpm (n) at the beginning of either the engaging or disengaging process is not influenced by a positive contribution from a driving torque ($M_{dMot}$); and (c) means for regulating at least one of the clutch transmission torque and the driving torque such that the clutch transmission torque ($M_{dK}$) is less than the driving torque ($M_{dMot}$) if the set curve of the driving rpm (n) is intended to rise, and such that the clutch transmission torque ($M_{dK}$) is greater than the driving torque ($M_{dMot}$) if the set curve of the driving rpm (n) is intended to decrease.

* * * * *